(12) United States Patent (10) Patent No.: US 12,638,088 B2
Cao et al. (45) Date of Patent: May 26, 2026

(54) CIRCULATION VALVE AND AIR CONDITIONER

(71) Applicant: Guangdong Carrier HVAC Co., Ltd, Foshan Guangdong (CN)

(72) Inventors: Peisen Cao, Foshan Guangdong (CN); Xing Liu, Foshan Guangdong (CN); Zhiheng Deng, Foshan Guangdong (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 47 days.

(21) Appl. No.: 18/887,015

(22) Filed: Sep. 16, 2024

(65) Prior Publication Data

US 2025/0092955 A1 Mar. 20, 2025

(30) Foreign Application Priority Data

Sep. 20, 2023 (CN) .......................... 202311220575.X

(51) Int. Cl.
F16K 11/065 (2006.01)
F16K 27/04 (2006.01)
(Continued)

(52) U.S. Cl.
CPC ........ F16K 11/0655 (2013.01); F16K 11/065 (2013.01); F16K 27/04 (2013.01);
(Continued)

(58) Field of Classification Search
CPC .. F16K 11/0655; F16K 31/383; F16K 11/065; F16K 27/04; F16K 27/048;
(Continued)

(56) References Cited

U.S. PATENT DOCUMENTS 2,974,682 A * 3/1961 Trask ...................... F25B 13/00
137/625.33
2,976,701 A * 3/1961 Greenawalt ........... F16K 31/423
251/30.05

(Continued)

FOREIGN PATENT DOCUMENTS

CN 106322860 A 1/2017
CN 106440565 A 2/2017
WO 2020088447 A1 5/2020

OTHER PUBLICATIONS

Extended European Search Report received for EP Application No. 24201762.2, mailed on Feb. 25, 2025, 8 Pages.

*Primary Examiner* — Michael R Reid
*Assistant Examiner* — Christopher D Ballman
(74) *Attorney, Agent, or Firm* — Souad Hakim

(57) ABSTRACT

A circulation valve comprises a flow control assembly and a pressure control assembly, where a containing cavity and a plurality of sub-channels are formed in the flow control assembly, the plurality of sub-channels all communicate with the containing cavity, a slide block is disposed in the containing cavity, the slide block is configured to move in the containing cavity to control the number of the sub-channels communicating with the containing cavity, and the slide block divides the containing cavity into a first containing cavity and a second containing cavity that do not communicate with each other; and the pressure control assembly can control a ratio of a pressure of the first containing cavity to a pressure of the second containing cavity so as to drive the slide block to move in the containing cavity.

10 Claims, 3 Drawing Sheets

(51) Int. Cl.

| | |
|---|---|
| *F16K 31/06* | (2006.01) |
| *F16K 31/12* | (2006.01) |
| *F16K 31/383* | (2006.01) |
| *F25B 1/00* | (2006.01) |
| *F25B 5/02* | (2006.01) |
| *F25B 39/02* | (2006.01) |
| *F25B 41/20* | (2021.01) |
| *F25B 41/37* | (2021.01) |

(52) U.S. Cl.
CPC .......... *F16K 27/048* (2013.01); *F16K 31/061* (2013.01); *F16K 31/12* (2013.01); *F16K 31/383* (2013.01); *F25B 1/005* (2013.01); *F25B 5/02* (2013.01); *F25B 39/028* (2013.01); *F25B 41/20* (2021.01); *F25B 41/37* (2021.01); *F25B 2313/02741* (2013.01)

(58) Field of Classification Search
CPC ........ F16K 31/061; F16K 31/12; F25B 41/20; F25B 2313/02741; F25B 5/02; F25B 39/028; F25B 41/37; F25B 1/005
See application file for complete search history.

(56) References Cited

U.S. PATENT DOCUMENTS

| | | | | |
|---|---|---|---|---|
| 3,400,736 | A * | 9/1968 | Bastle | F25B 41/26 251/30.05 |
| 3,894,561 | A * | 7/1975 | Thornbery | F25B 41/26 137/625.29 |
| 3,952,537 | A * | 4/1976 | Aoki | F25B 41/26 62/324.6 |
| 4,213,483 | A * | 7/1980 | Bauer | F16K 11/0655 251/366 |
| 4,248,058 | A * | 2/1981 | Bauer | F25B 41/26 236/80 G |
| 4,255,939 | A * | 3/1981 | Ou | F25B 41/26 137/625.29 |
| 4,290,453 | A * | 9/1981 | Bauer | F25B 41/26 137/625.29 |
| 4,573,497 | A * | 3/1986 | White | F25B 41/26 137/625.29 |
| 4,760,709 | A * | 8/1988 | Aoki | F25B 47/022 137/625.43 |
| 5,038,827 | A * | 8/1991 | Heffner | F25B 41/22 137/625.33 |
| 6,684,651 | B1 * | 2/2004 | Yoshizawa | F16K 11/0655 236/80 R |
| 6,830,073 | B2 * | 12/2004 | Lee | F15B 13/0435 251/59 |
| 7,216,503 | B2 * | 5/2007 | Heyl | B60H 1/00907 62/324.1 |
| 9,851,106 | B2 * | 12/2017 | Lindholm | F02C 7/232 |
| 10,018,382 | B2 * | 7/2018 | Song | F16K 31/363 |
| 10,330,359 | B2 * | 6/2019 | Yu | F16K 31/1635 |
| 2020/0370804 | A1 * | 11/2020 | Snider | F25B 41/20 |

* cited by examiner

CIRCULATION VALVE AND AIR CONDITIONER

CROSS REFERENCE TO A RELATED APPLICATION

The application claims the benefit of China Patent Application No. 202311220575.x filed Sep. 20, 2024, the contents of which are hereby incorporated in their entirety.

TECHNICAL FIELD

The present application relates to the technical field of air conditioners, and more specifically, to a circulation valve and an air conditioner.

BACKGROUND

In the field of air conditioners, when dehumidification is required, a refrigerant needs to be transported from a condenser to an evaporator, and then the evaporator lowers the indoor temperature by fully utilizing the heat absorption properties of the refrigerant, so as to achieve an effect of dehumidification.

However, in the prior art, a circulation valve in an air conditioner can only control the circulation or closing of refrigerant, so that the dehumidification has only two modes, namely, a dehumidification mode and a non-dehumidification mode. Users can only control the switching of the dehumidification mode, but cannot control the degree of dehumidification. When only slight dehumidification is required, an entire dehumidification system needs to be fully started, which results in a waste of air-conditioning energy consumption.

SUMMARY

The technical problem to be solved by embodiments of the present application is that existing circulation valves cannot achieve flow control.

To solve the above technical problem, the embodiments of the present application provide a circulation valve comprising a flow control assembly and a pressure control assembly. A containing cavity and a plurality of sub-channels are formed in the flow control assembly, the plurality of sub-channels all communicate with the containing cavity, a slide block is disposed in the containing cavity, the slide block is configured to move in the containing cavity to control the number of the sub-channels communicating with the containing cavity, and the slide block divides the containing cavity into a first containing cavity and a second containing cavity that do not communicate with each other; and the pressure control assembly is configured to control a ratio of a pressure of the first containing cavity to a pressure of the second containing cavity so as to drive the slide block to move in the containing cavity.

Further, the flow control assembly further comprises a second baffle and a connecting rod, the slide block is movably disposed in the containing cavity, and the second baffle and the connecting rod, together with the slide block, define the first containing cavity;

one end of the connecting rod is connected to the second baffle, and the other end is connected to the slide block; and the second baffle is linked up with the slide block to maintain a constant space size of the first containing cavity.

Further, the flow control assembly further comprises a spring having one end abutting against the second baffle and the other end abutting against an inner wall of the containing cavity, and configured to drive the baffle and the slide block to reset.

Further, the pressure control assembly comprises:

a circulating conduit communicating with the first containing cavity;

a pressure-dividing conduit communicating with the second containing cavity;

a flow limiting member, configured to reduce a flow of the pressure-dividing conduit and/or the circulating conduit to control the ratio of the pressure of the first containing cavity to the pressure of the second containing cavity; and a main conduit, one end of which is for the refrigerant to flow into, and the other end of which communicates with the circulating conduit and/or the pressure-dividing conduit.

Further, the flow limiting member is a capillary tube having one end connected to the main conduit and the other end communicating with the circulating conduit and configured to reduce the flow of the refrigerant; and/or, the ratio of the pressure of the first containing cavity to the pressure of the second containing cavity is (0.3-0.75):1.

Further, the flow limiting member is a capillary tube comprising a first capillary tube and a second capillary tube;

the pressure-dividing conduit comprises a first pressure-dividing conduit and a second pressure-dividing conduit;

one end of the first pressure-dividing conduit communicates with the main conduit, and the other end communicates with the second containing cavity;

one end of the first capillary tube communicates with the main conduit, and the other end communicates with the second pressure-dividing conduit and the second capillary tube;

the second pressure-dividing conduit communicates with the second containing cavity; and one end of the second capillary tube communicates with the first capillary tube, and the other end communicates with the circulating conduit.

Further, the pressure control assembly further comprises an electromagnetic structure configured to control the communication or disconnection of the pressure-dividing conduit to control the ratio of the pressure of the first containing cavity to the pressure of the second containing cavity.

Further, a moving direction of the slide block is a length direction, the number of the sub-channels is N, and N is greater than 2; and a length of the slide block is greater than a sum of lengths of N−1 sub-channels.

The present application further provides an air conditioner comprising a condenser, a circulation valve, an evaporator, and a compressor;

the condenser is configured to convert a gaseous refrigerant into a liquid refrigerant, and one end of the condenser communicates with the compressor, and the other end communicates with the circulation valve;

one end of the evaporator communicates with the circulation valve, and the other end communicates with the compressor; and the circulation valve is located between the evaporator and the condenser, and configured to control a flow of the liquid refrigerant.

Further, the number of the evaporators is consistent with the number of the sub-channels; and a plurality of sub-channels are respectively connected to a plurality of evaporators in a one-to-one correspondence form.

Compared with the prior art, the embodiments of the present application mainly have the following beneficial effects:

according to the present application, the slide block can be controlled to move by pressure, so as to adjust an amount of a refrigerant flowing out of the sub-channels. When the sub-channels of the circulation valve according to the present application are connected to the evaporator, the amount of the refrigerant entering the evaporator can be controlled, so as to achieve adjustment and control on the degree of dehumidification.

BRIEF DESCRIPTION OF DRAWINGS

In order to explain the solutions in the present application or the prior art more clearly, the drawings to be used in the description of the embodiments or the prior art will be briefly described below. Obviously, the drawings depicted below are merely some embodiments of the present application, and those of ordinary skill in the art can obtain other drawings based on these drawings without any creative efforts.

Figure 1:
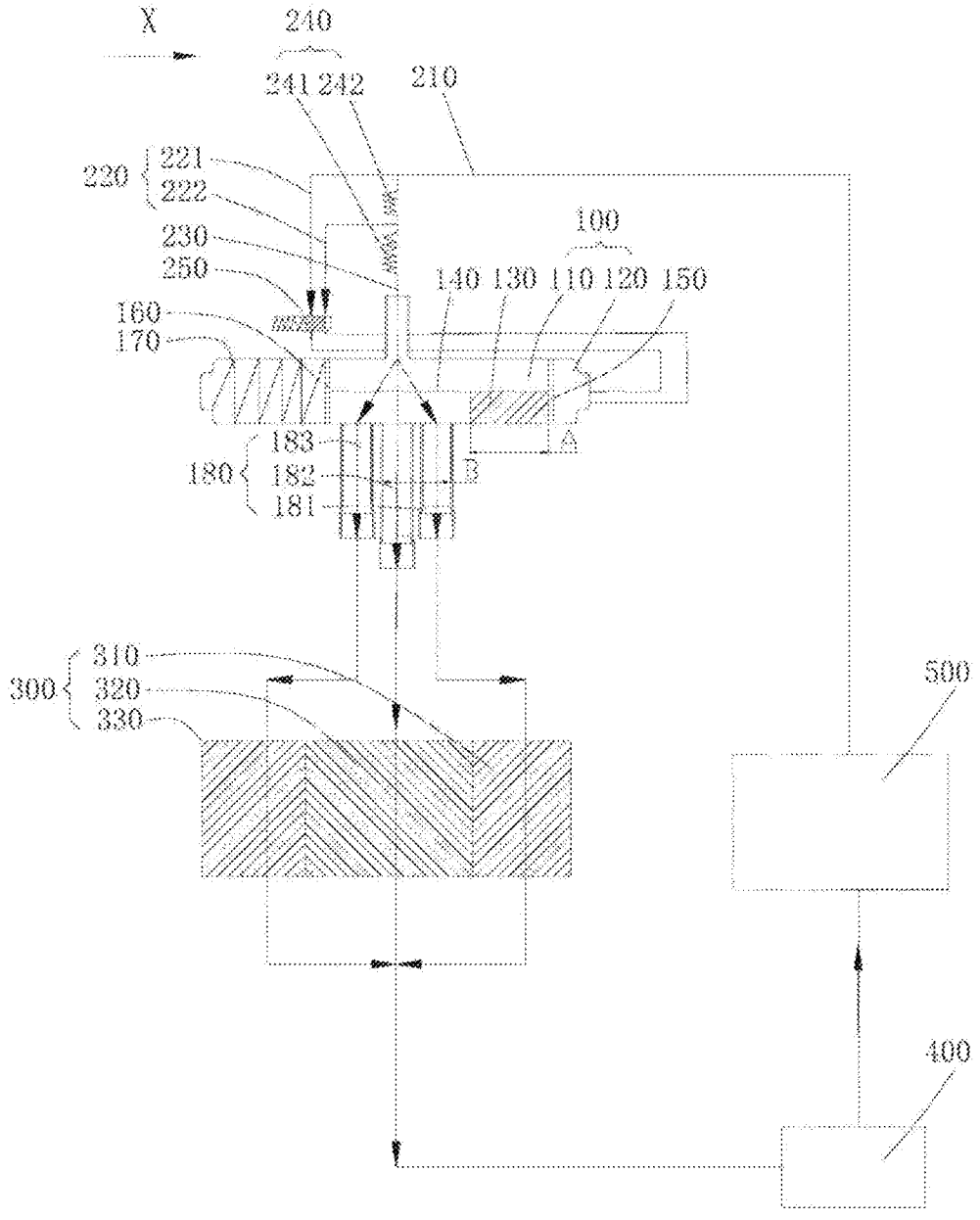
FIG. 1 is a schematic structural diagram of a dehumidification system according to embodiments of the present application.

REFERENCE NUMERALS containing cavity 100, first containing cavity 110, second containing cavity 120, slide block 130, connecting rod 140, first baffle 150, second baffle 160, spring 170, sub-channel 180, first sub-channel 181, second sub-channel 182, third sub-channel 183, main conduit 210, pressure-dividing conduit 220, first pressure-dividing conduit 221, second pressure-dividing conduit 222, circulating conduit 230, capillary tube 240, first capillary tube 241, second capillary tube 242, electromagnetic structure 250, evaporator 300, first evaporator 310, second evaporator 320, third evaporator 330, compressor 400, and compressor 500.

DESCRIPTION OF THE EMBODIMENTS

Unless otherwise defined, all technical and scientific terms used herein shall have the same meanings as those generally understood by those skilled in the art. The terms herein used in the specification of the present application are intended merely for the purpose of describing specific embodiments and are not intended to limit the present application. The terms "include" and "have" and any variations thereof in the specification and claims and the above brief description of the drawings of the present application are intended to cover non-exclusive inclusion. The terms "first" and "second" and the like in the specification and the claims or the drawings of the present application are used to distinguish different objects rather than to describe a particular sequence.

Reference herein to an "embodiment" means that a particular feature, structure, or characteristic described in connection with the embodiments can be included in at least one embodiment of the present invention. The appearances of this phrase in various places in the specification are not necessarily all referring to the same embodiment, nor are separate or alternative embodiments mutually exclusive of other embodiments. It is explicitly and implicitly understood by those skilled in the art that the embodiments described herein may be combined with other embodiments.

Figure 2:
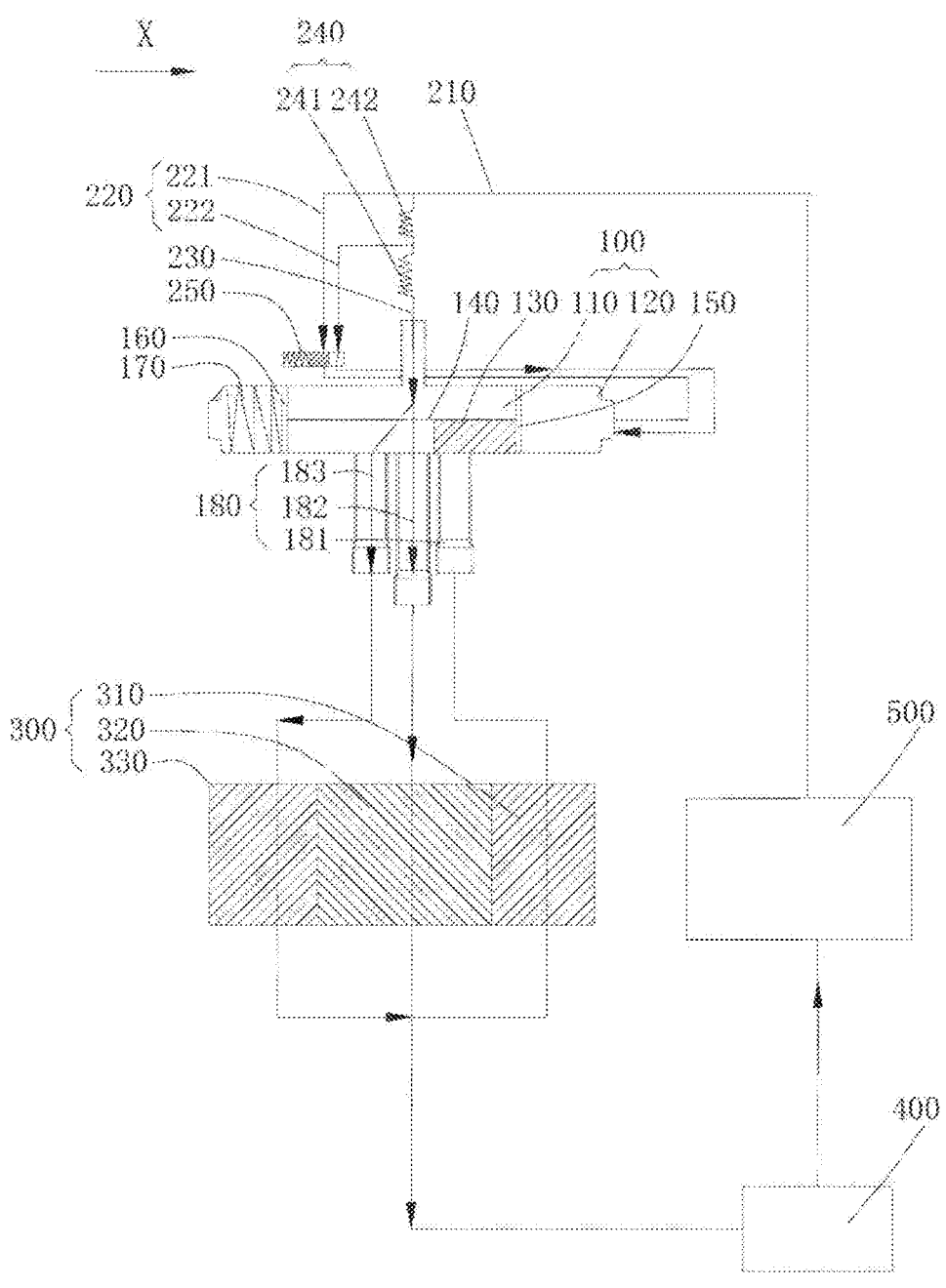
FIG. 2 is a schematic diagram of the dehumidification system in which a first sub-channel of a circulation valve is closed according to embodiments of the present application.
Figure 3:
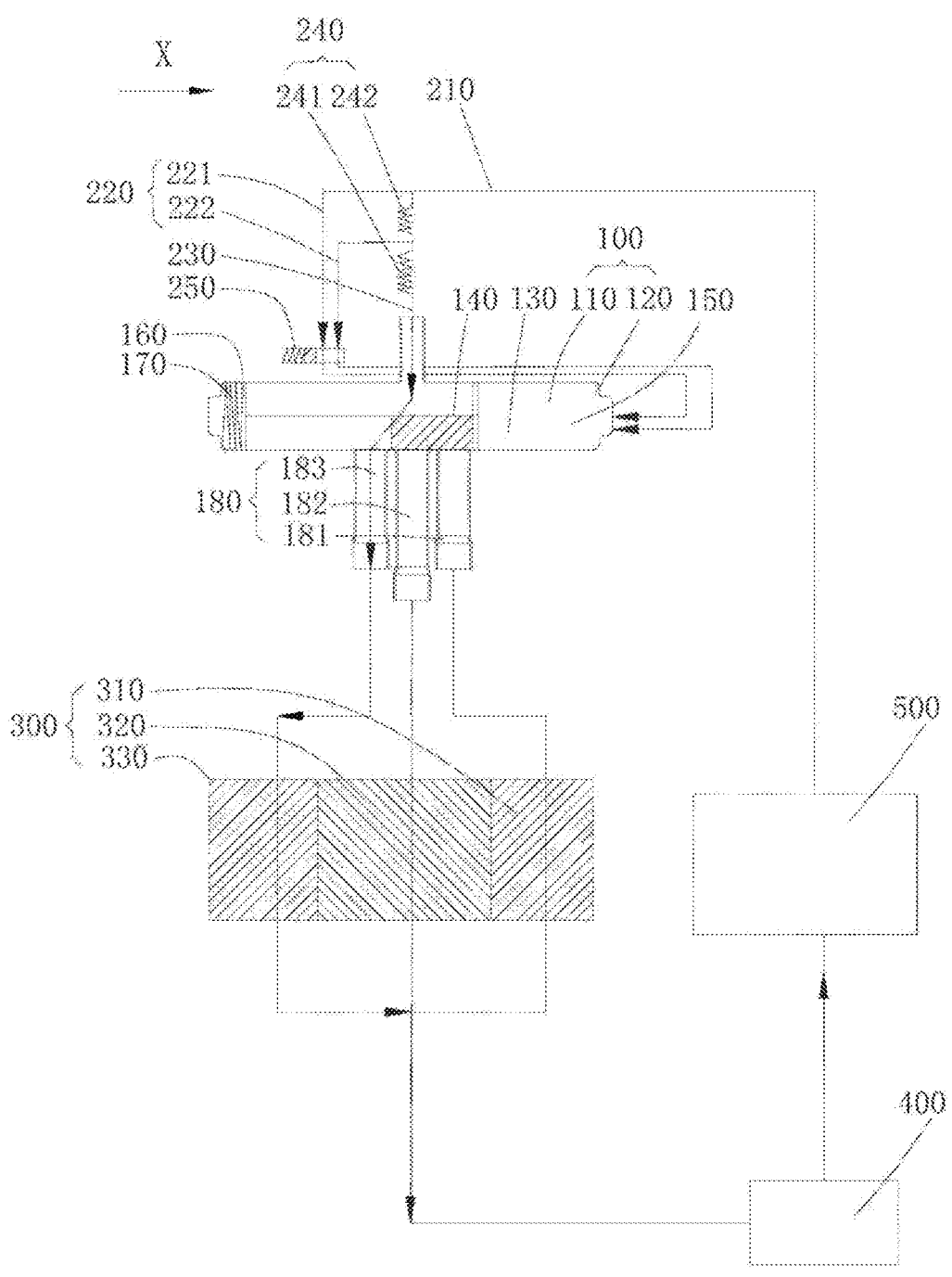
FIG. 3 is a schematic diagram of the dehumidification system in which the first sub-channel and a second sub-channel of the circulation valve are closed according to embodiments of the present application.

Reference is made to FIGS. 1-3 in which a X direction is a left-right direction. Directions indicated by arrows in the figures are refrigerant flow directions. The present application provides a circulation valve configured to control a circulation amount of a refrigerant. The circulation valve includes: a flow control assembly in which a containing cavity 100 and a plurality of sub-channels 180 are formed, the plurality of sub-channels 180 are all communicate with the containing cavity 100, a slide block 130 is arranged in the containing cavity 100, the slide block 130 is configured to move in the containing cavity 100 to control the number of sub-channel 180 communicating with the containing cavity 100, and the slide block 130 divides the containing cavity 100 into a first containing cavity 110 and a second containing cavity 120 that do not communicate with each other; and a pressure control assembly, configured to control a ratio of a pressure of the first containing cavity 110 to a pressure of the second containing cavity 120, so as to drive the slide block 130 to move in the containing cavity 100 by changing the pressure ratio.

Specifically, reference is further made to FIG. 1, the sub-channel 180 includes a first sub-channel 181, a second sub-channel 182, and a third sub-channel 183, and the first sub-channel 181, the second sub-channel 182, and the third sub-channel 183 are all disposed at a lower end of the containing cavity 100. The slide block 130 further includes a first baffle 150, and the first baffle 150 can divide the containing cavity 100 into a first containing cavity 110 and a second containing cavity 120 that are isolated from each other. At this time, the ratio of the pressure of the first containing cavity 110 to the pressure of the second containing cavity 120 can be changed by the pressure control assembly, so that the slide block 130 can move leftward and rightward along an inner wall of the containing cavity 100 driven by a pressure.

Reference is made to FIG. 2, when the pressure of the second containing cavity 120 is greater than the pressure of the first containing cavity 110, the slide block 130 will move from right to left, and when the slide block 130 moves to a position shown in the figure, the slide block 130 blocks up a passage between the first containing cavity 110 and the first sub-channel 181, thereby reducing a total flow of the refrigerant flowing out of the sub-channels 180. As the slide block 130 continues to move to the left, the total amount of the refrigerant flowing out of the sub-channels 180 can be gradually reduced or even completely blocked. To sum up, according to the present application, the slide block 130 can be controlled to move by pressure, so as to adjust the total amount of the refrigerant flowing out of the sub-channels 180. When the sub-channels 180 of the circulation valve according to the present application are connected to an evaporator 300, the amount of the refrigerant entering the evaporator 300 can be controlled so as to achieve adjustment and control on the degree of dehumidification.

In some embodiments, reference is made to FIGS. 1-3, the flow control assembly further includes a second baffle 160 and a connecting rod 140, the slide block 130 is movably disposed in the containing cavity 100, and the flow control assembly, together with the slide block 130, defines a first containing cavity 110; one end of the connecting rod 140 is connected to the second baffle 160, and the other end is connected to the slide block 130; when the slide block 130 moves, the second baffle 160 moves together with the slide block 130 under the abutting of the connecting rod to maintain a constant space size of the first containing cavity 110.

During the actual use of the circulation valve, when the circulation valve is required to achieve precise refrigerant flow control, for example, when the flow needs to be reduced to two-thirds of the original, if the second baffle 160 is not provided, a space of the first containing cavity 110 will be reduced when the slide block 130 moves leftwards to the position in FIG. 2, at this time, the pressure of the refrigerant in the first containing cavity 110 will increase and change, which will lead to an increase in a flow velocity of the refrigerant, and may make the flow of the refrigerant the same as or slightly different from that before the slide block 130 blocks up the first sub-channel 181, so that the flow is controlled to be not equal to two-thirds; at the same time, the pressure change of the first containing cavity 110 will also cause a moving distance of the slide block 130 to become shorter, and the slide block 130 can be pushed to move only by continuously increasing the pressure of the second containing cavity 120, thereby resulting in an increased energy consumption; then, the gradual reduction in the volume of the first containing cavity 110 may also cause the refrigerant in the sub-channel 180 to be blocked due to a rapid change in a circulation area.

In summary, in the present embodiment, a second baffle 160 is provided, and the second baffle 160 can move together with the slide block 130 through the connecting rod 140, at this time, as the slide block 130 moves to the left, the space size of the first containing cavity 110 remains unchanged, that is, the pressure can also remain unchanged, thereby improving the accuracy of the flow control of the circulation valve, reducing the energy consumption of the circulation valve or an air-conditioner device equipped with the circulation valve, and avoiding refrigerant blockage.

In some embodiments, reference is made to FIGS. 1-3, the flow control assembly further includes a spring 170 having one end abutting against the second baffle 160 and the other end abutting against an inner wall of the containing cavity 100, and configured to drive the baffle and the slide block 130 to reset During an adjustment process of the circulation valve, the slide block 130 is often required to move to the left to control the flow and then reset, so as to keep the sub-channels 180 fully communicating with the first containing cavity 110 when the circulation valve is not started; at the same time, compared with the use of the motor and the pressure control assembly to reset the slide block 130, the resetting by the spring 170 will be achieved by only adding a spring 170, and a reset effect can be achieved without a need for an additional mechanism, thereby reducing the production cost of the circulation valve.

In some embodiments, reference is made to FIGS. 1-3, the pressure control assembly includes: a circulating conduit 230, a main conduit 210, a flow limiting member, and a pressure-dividing conduit 220; the circulating conduit 230 communicates with the first containing cavity 110; the pressure-dividing conduit 220 communicates with the second containing cavity 120; the flow limiting member is configured to reduce the flow of the pressure-dividing conduit 220 and/or the circulating conduit 230 to control the ratio of the pressure of the first containing cavity 110 to the pressure of the second containing cavity 120; and one end of the main conduit 210 is for gas or liquid to flow in, and the other end communicates with the circulating conduit 230 and/or the pressure-dividing conduit 220.

When the circulating conduit 230 and the pressure-dividing conduit 220 are both connected to the main conduit 210, the flow limiting member is used to reduce the flow of the refrigerant, so that the pressure of the refrigerant flowing into the first containing cavity 110 is less than the pressure of the refrigerant in the second containing cavity 120, thereby achieving an effect of driving the slide block 130 to move by pressure. It is understandable that the flow limiting member can also achieve an effect of reducing the flow of the pressure-dividing conduit 220, so that the pressure in the second containing cavity 120 is less than that in the first containing cavity 110, thereby achieving the reset or rightward movement of the slide block 130. It is understandable that the flow limiting member includes contraction assemblies capable of reducing diameters of pipes, continuously bent pipes, and pipes with diameters smaller than those of the pressure-dividing conduit 220 and the circulating conduit 230, so as to achieve a flow reduction effect.

In some embodiments, reference is made to FIGS. 1-3, if the flow limiting member is a capillary tube 240, one end of the capillary tube 240 is connected to the main conduit 210, and the other end communicates with the circulating conduit 230, so as to reduce the flow of the refrigerant. At this time, the diameter of the capillary tube 240 is less than that of the circulating conduit 230, so when the circulating conduit 230 is connected to the main conduit 210 through the capillary tube 240, it can achieve a flow limitation effect. Compared with use of a contraction assembly to achieve the flow limitation effect, direct use of the capillary tube 240 to limit the flow can reduce the production cost of the circulation valve.

In some embodiments, reference is made to FIGS. 1-3, the flow limiting member is the capillary tube 240, and the capillary tube 240 includes a first capillary tube 241 and a second capillary tube 242; the pressure-dividing conduit 220 includes a first pressure-dividing conduit 221 and a second pressure-dividing conduit 222; one end of the first pressure-dividing conduit 221 communicates with the main conduit 210, and the other end communicates with the second containing cavity 120; one end of the first capillary tube 241 communicates with the main conduit 210, and the other end communicates with the second pressure-dividing conduit 222 and the second capillary tube 242; the second pressure-dividing conduit 222 communicates with the second containing cavity 120; and one end of the second capillary tube 242 communicates with the first capillary tube 241, and the other end communicates with the circulating conduit 230. At this time, the ratio of the pressure of the first containing cavity 110 to the pressure of the second containing cavity 120 can be controlled by controlling the communication or closing of the first pressure-dividing tube and the second pressure-dividing tube.

For example, the pressure in the first pressure-dividing conduit 221 is set as P10, the pressure in the second pressure-dividing conduit 222 is set as P20, and the pressure in the circulating conduit 230 is set as P30. Since the first pressure-dividing conduit 221 is directly connected to the main conduit 210, both ends of the second pressure-dividing conduit 222 respectively communicate with the first capillary tube 241 and the second capillary tube 242, and the circulating conduit 230 communicates with the second capillary tube 242, so P10 is greater than P20 greater than P30. At this time, according to the state of communicating the first pressure-dividing conduit 221 and the second pressure-dividing conduit 222 with the second containing cavity 120, the pressure in the second containing cavity 120 can be any of P10+P20, P10, and P20, where when the first pressure-dividing conduit 221 and the second pressure-dividing conduit 222 both communicate with the second containing cavity, the pressure of the second containing cavity 120 is P10+P20. When only the first pressure-dividing conduit 221 communicates with the second containing cavity, the pressure in the second containing cavity 120 is P10. When only the second pressure-dividing conduit 222 communicates with the second containing cavity, the pressure in the second containing cavity 120 is P20.

In summary, the slide block 130 has three moving speeds. When the first baffle 150 is not provided on the left side of the slide block 130, as the slide block 130 moves to the left, the space of the first containing cavity 110 will decrease, that is, a pressure assembly of the first containing cavity 110 will increase. At this time, the pressures of the first containing cavity 110 when the slide block 130 is at the position shown in FIG. 2 and the position shown in FIG. 3 can be measured and recorded as P31 and P32 respectively, and by adjusting the size of the capillary tube 240, P10+P20 can be equal to P32, and P20 can be equal to P31. Therefore, when only the second pressure-dividing conduit 222 communicates with the second containing cavity 120, the slide block 130 is located at the position shown in FIG. 2, at which time the first sub-channel 181 is blocked by the slide block 130, so the amount of the refrigerant allowed to flow through the circulation valve is reduced. When the second containing cavity 120 communicates with the first pressure-dividing conduit 221 and the second pressure-dividing conduit 222, the slide block 130 is located at the position shown in FIG. 3, at which time the second sub-channel 182 and the first sub-channel 181 are both blocked by the slide block 130, so the amount of the refrigerant allowed to pass through the circulation valve is further reduced. That is, a three-stage control of the circulation valve is realized, so that the air conditioner equipped with the circulation valve has three dehumidification modes: high, medium and low, thereby improving the energy efficiency of the air conditioner.

It is understandable that when the circulation valve has the spring 170 and the first baffle 150, an elastic force of the spring 170 is set as F10, and the first baffle 150 and the second baffle 160 each have an area of S. When a rightward force on the first baffle 150 is set as F20 and a leftward force is set as F3, the following relationship exists:

$$F20 = F10 + P10/S;$$

$$F30 = P20/S, \text{ or } F30 = (P10 + P20)/S;$$

It can be seen from the above embodiment that as the slide block 130 moves, the spring 170 will continue to be compressed, and the elastic force F10 will increase. Once the elastic force of the spring 170 is set as F11 when the slide block 130 is at the position shown in FIG. 2, the following relationship exists:

F20=F30=F10+P10/S=P20/S. At this time, only the second pressure-dividing conduit 222 communicates with the second containing cavity 120, and the first sub-channel 181 is blocked by the slide block 130, so the flow of the refrigerant allowed to flow through the circulation valve is relatively small.

Once the elastic force of the slide block 130 is set as F12 when it is located at the position shown in FIG. 3, the following relationship exists:

F20=F30=F12+P10/S=(P10+P20)/S. At this time, the first pressure-dividing conduit 221 and the second pressure-dividing conduit 222 both communicate with the second containing cavity 120, and the first sub-channel 181 and the second sub-channel 182 are both blocked by the slide block 130, so the flow of the refrigerant allowed to flow through the circulation valve is the minimum.

Further, the ratio of the pressure of the first containing cavity 110 to the pressure of the second containing cavity 120 is (0.3-0.75):1. At this time, an acceleration and a speed of the slide block 130 when sliding are appropriate, which can avoid jittered offsets caused by too fast movements of the slide block 130 or a long dehumidification mode switching time caused by too slow movements.

When the first pressure-dividing conduit 221 and the second pressure-dividing conduit 222 are both blocked up, that is, the pressure control assembly is in a non-operating state, the slide block 130 is located at the position shown in FIG. 1 under the action of the spring 170, and the flow allowed to flow through the circulation valve is the maximum. In summary, according to the embodiments of the present application, the control of three gears of the circulation valve can be achieved by communicating and blocking the first pressure-dividing conduit 221 and the second pressure-dividing conduit 222.

In some embodiments, reference is made to FIGS. 1-3, the pressure control assembly further includes an electromagnetic structure 250, the electromagnetic structure 250 may be an electromagnetic valve for controlling the communication or disconnection of the pressure-dividing conduit 220 to control the ratio of the pressure of the first containing cavity 110 to the pressure of the second containing cavity 120. The electromagnetic structure 250 controls the communication or disconnection of the pressure-dividing conduit 220 by electromagnetically controlling the magnetic slide block 130 to squeeze the pressure-dividing conduit 220 so that the pressure-dividing conduit 220 is communicated or disconnected. Alternatively, the electromagnetic structure 250 includes a transfer chamber, at least one circulating opening is formed at an upper end of the transfer chamber, and a circulating pipe is disposed at a lower end of the transfer chamber, the circulating pipe is connected to the second containing cavity 120, and the circulating opening is connected to the pressure-dividing conduit. At this time, the electromagnetic structure 250 can control the communication or disconnection between the pressure-dividing conduit 220 and the second containing cavity 120 by controlling the magnetic slide block 130 to block the circulating opening. It is understandable that, reference is further made to FIG. 1, when there are a plurality of pressure-dividing conduits 220, the number of the circulating opening can be consistent with that of the pressure-dividing conduit 220, and the pressure-dividing conduits 220 are in one-to-one correspondence with the circulating openings. At this time, the slide block 130 can be controlled to move to control the high, medium and low gear switching of the circulation valve.

In some embodiments, reference is made to FIG. 1, a moving direction of the slide block 130 is a length direction, the number of the sub-channels 180 is N, and N is greater than 2; and

a length of the slide block 130 is greater than a sum of lengths of N–1 sub-channels 180. The length of the slide block 130 is A as shown in FIG. 1, and the sum of the lengths of the N–1 sub-channels 180 is B. If A is less than B, when the slide block 130 is located in FIG. 2, the slide block 130 will not be able to block the first sub-channel 181 and the second sub-channel 182 simultaneously, that is, the slide block 130 cannot accurately adjust the gear of the circulation valve. When A is greater than or equal to B, the slide block 130 can block a plurality of sub-channels 180 simultaneously, thereby achieving multi-gear precise control of the convection valve. It is understandable that, reference is made to FIG. 1, the sum of the lengths of the N–1 sub-channels 180 should be understood to include the diameter of the sub-channel 180 and the distance between adjacent sub-channels 180.

Reference is made to FIGS. 2 and 3, the present application also provides an air conditioner which includes a compressor 500, a circulation valve, an evaporator 300, and a compressor 400; the compressor 500 is configured to convert a gaseous refrigerant into a liquid refrigerant, one end of the compressor communicates with the compressor 400, and the other end communicates with the circulation valve; one end of the evaporator 300 communicates with the circulation valve, and the other end communicates with the compressor 400; and the circulation valve is located between the evaporator 300 and the compressor 500, and configured to control a flow of the refrigerant. At this time, the compressor 400 can provide power for the refrigerant, so that the refrigerant In some embodiments, reference is made to FIGS. 1-3, the number of the evaporator 300 is consistent with the number of the sub-channels 180; and a plurality of sub-channels 180 are respectively connected to a plurality of evaporators 300 in a one-to-one correspondence form. The sub-channels 180 include a first sub-channel 181, a second sub-channel 182, and a third sub-channel 183, and the evaporators 300 include a first evaporator 310, a second evaporator 320, and a third evaporator 330. The first sub-channel 181, the second sub-channel 182, and the third sub-channel 183 are connected to the first evaporator 310, the second evaporator 320, and the third evaporator 330, respectively. Compared with the plurality of sub-channels 180 communicating with one evaporator 300, according to the embodiments of the present application, the dehumidification effects corresponding to high, medium and low gears of the air conditioner during dehumidification can be changed by changing the sizes of the plurality of evaporators 300, and the separate maintenance and disassembly of the evaporator 300 also are facilitated.

The circulation valve and the air conditioner provided in the embodiments of the present application are introduced in detail above. Specific examples are used herein to illustrate the principles and implementation methods of the present application. The description of the above embodiments above is intended only to assist in understanding methods of the present application and its core ideas; at the same time, for those skilled in the art, according to the ideas of the present application, there will be changes in the specific implementation methods and application scope. In summary, the content of the specification should not be understood as a limitation on the present application.

Apparently, the embodiments described above are merely some rather than all of the embodiments of the present disclosure. The preferred embodiments of the present application are given in the Drawings, but do not limit the Claims of the present application. The present application may be embodied in many different forms; rather, these embodiments are provided in order to provide thorough and comprehensive understanding of the disclosure of the present application. Although the present application has been described in detail with reference to the foregoing embodiments, those skilled in the art can still modify the technical solutions recited in the foregoing specific implementations, or make equivalent substitutions for some of the technical features thereof. Any equivalent structure made using the contents of the specification and drawings of the present application and directly or indirectly used in other related technical fields shall similarly fall within the scope of patent protection of the present application.

Although the embodiments of the present application have been shown and described, it will be appreciated by those skilled in the art that various changes, modifications, combinations, substitutions and variations may be made to these embodiments without departing from the principles and purpose of the present application, and that the scope of the present invention is defined by the claims and their equivalents.

The invention claimed is:

1. A circulation valve configured to control a flow of a refrigerant, comprising:
   a flow control assembly in which a containing cavity and a plurality of sub-channels are formed, wherein the plurality of sub-channels all communicate with the containing cavity, a slide block is disposed in the containing cavity, the slide block is configured to move in the containing cavity to control the number of the sub-channels communicating with the containing cavity, and the slide block divides the containing cavity into a first containing cavity and a second containing cavity that do not communicate with each other; and
   a pressure control assembly, configured to control a ratio of a pressure of the first containing cavity to a pressure of the second containing cavity so as to drive the slide block to move in the containing cavity, wherein the pressure control assembly comprises
      a flow limiting member including at least a first capillary tube and a second capillary tube arranged in fluid communication with each other;
      a main conduit configured to receive the refrigerant; and
      a pressure-dividing conduit communicating with the second containing cavity, wherein the flow limiting member and the pressure-dividing conduit are arranged to establish a staged pressure drop between the main conduit and the second containing cavity.

2. The circulation valve according to claim 1, wherein the flow control assembly further comprises a second baffle and a connecting rod, which, together with the slide block, define the first containing cavity;
   one end of the connecting rod is connected to the second baffle, and the other end is connected to the slide block; and
   the second baffle is linked up with the slide block to maintain a constant space size of the first containing cavity.

3. The circulation valve according to claim 2, wherein the flow control assembly further comprises a spring having one end abutting against the second baffle and the other end abutting against an inner wall of the containing cavity, and configured to drive the baffle and the slide block to reset.

4. The circulation valve according to claim 1, wherein the pressure control assembly comprises:

a circulating conduit communicating with the first containing cavity, wherein:

the flow limiting member is configured to reduce a flow of the pressure-dividing conduit and/or the circulating conduit to control the ratio of the pressure of the first containing cavity to the pressure of the second containing cavity, and the main conduit is configured such that, one end of the main conduit is for the refrigerant to flow into, and the other end communicates with the circulating conduit and/or the pressure-dividing conduit.

5. The circulation valve according to claim 1, wherein the flow limiting member is a capillary tube having one end connected to the main conduit and the other end communicating with the circulating conduit, and configured to reduce the flow of the refrigerant; and/or, the ratio of the pressure of the first containing cavity to the pressure of the second containing cavity is (0.3-0.75):1.

6. The circulation valve according to claim 1, wherein the pressure-dividing conduit comprises a first pressure-dividing conduit and a second pressure-dividing conduit;

one end of the first pressure-dividing conduit communicates with the main conduit, and the other end communicates with the second containing cavity;

one end of the first capillary tube communicates with the main conduit, and the other end communicates with the second pressure-dividing conduit and the second capillary tube;

the second pressure-dividing conduit communicates with the second containing cavity; and one end of the second capillary tube communicates with the first capillary tube, and the other end communicates with the circulating conduit.

7. The circulation valve according to claim 1, wherein a moving direction of the slide block is a length direction, the number of the sub-channels is N, and N is greater than 2; and a length of the slide block is greater than a sum of lengths of N−1 sub-channels.

8. An air conditioner, comprising a condenser, an evaporator, a compressor and the circulation valve according to claim 1, wherein the condenser is configured to convert a gaseous refrigerant into a liquid refrigerant, and one end of the condenser communicates with the compressor, and the other end communicates with the circulation valve;

one end of the evaporator communicates with the circulation valve, and the other end communicates with the compressor; and the circulation valve is located between the evaporator and the condenser, and configured to control a flow of the liquid refrigerant.

9. The air conditioner according to claim 8, wherein the number of the evaporator is consistent with the number of a sub-channel; and a plurality of sub-channels are respectively connected to a plurality of evaporators in a one-to-one correspondence form.

10. A circulation valve configured to control a flow of a refrigerant, comprising:

a flow control assembly in which a containing cavity and a plurality of sub-channels are formed, wherein the plurality of sub-channels all communicate with the containing cavity, a slide block is disposed in the containing cavity, the slide block is configured to move in the containing cavity to control the number of the sub-channels communicating with the containing cavity, and the slide block divides the containing cavity into a first containing cavity and a second containing cavity that do not communicate with each other; and a pressure control assembly, configured to control a ratio of a pressure of the first containing cavity to a pressure of the second containing cavity so as to drive the slide block to move in the containing cavity, wherein the pressure control assembly further comprises an electromagnetic structure configured to selectively control communication or disconnection of a pressure-dividing conduit relative to the second containing cavity.

* * * * *